United States Patent Office 2,813,071
Patented Nov. 12, 1957

2,813,071

PRODUCTION OF THERMOSETTING RESIN COMPLEX

Ladislao Jose Biro, Buenos Aires, Argentina

No Drawing. Application May 29, 1953,
Serial No. 358,550

12 Claims. (Cl. 204—158)

The present invention relates to the production of a fusible plastic mass made by condensing a mixture of a monohydric phenol or urea, or a mixture of a monohydric phenol and urea, with an aldehyde, and more preferably a formaldehyde-liberating aldehyde, there being present in the mixture an alkaline salt of low acidity as, for example, an alkali silicate, an alkali aluminate, or an alkali zincate. Satisfactory results are obtained when using sodium silicate, sodium aluminate, and sodium zincate, although the potassium or lithium silicate, or potassium or lithium aluminate, or potassium or lithium zincate may be used. A mixture of this character forms a gel, and the latter is subjected to the action of infra red rays to polymerize the mixture. When subjected to said infra red rays, an exothermic reaction occurs whereby the material being treated is polymerized, and further the infra red rays accelerate to a marked extent the rapidity of the polymerization.

The present invention also contemplates the production of a molding material from the herein-described condensation complex. The method of the present invention has the advantage of shortening the time necessary for obtaining the condensation product. It is known that a mixture of phenol and an aldehyde as, for example, formaldehyde, heated in the presence of an alkaline or alkali catalyzer reacts to form a phenol-aldehyde condensation product known as Bakelite A and B, said product when loading materials are added thereto being capable of being molded by heat and pressure in order to produce the desired article.

The method above set forth is characterized by the defect of being slow and discontinuous and, therefore, in a given length of time only a predetermined relatively small production is possible, thereby increasing the cost of the primary plant and also the cost of the condensation product itself. The first state of this procedure in order to form resin B takes over four hours. Another inconvenience is that the initiated polymerization continues in the autoclave, causing the material to harden which makes it difficult to empty said autoclave. To eliminate these inconveniences, in practice, the phenol is condensated with insufficient amount of formaldehyde, in the presence of an acid catalyzer, thus obtaining type A Bakelite, denominated "Novolac," which, unless a further amount of formaldehyde is added, cannot be transformed into an insoluble unfusible resin. During the manufacturing process, a further amount of formaldehyde must be added, and the filling materials must be mixed with hexamethylenetetramine, which only under the action of the mold-heat decomposes into aldehyde and ammonia, making it possible to transform the mass into an unfusible and insoluble type C resin. This last procedure is much safer but takes longer and is more expensive than the first procedure. Experiments have been carried out in order to shorten the working-time, but these experiments in the main have been failures, and it has been impossible to obtain a phenol-aldehyde or urea-aldehyde or phenol-urea-aldehyde condensation product with the correct amount of condensation in a shorter period of time than above specified.

In accordance with the present invention, the time of reaction is greatly shortened, and the invention is based upon the discovery that the effects of infra red rays accelerate to a marked degree the polymerization of the aldehyde-phenol condensation products or the aldehyde-urea condensation products, or the aldehyde-phenol-urea condensation products, when these components are mixed with an alkaline salt of low acidity, such as alkali silicate typified by sodium silicate, potassium silicate, lithium silicate, or the other salts, such as the alkali aluminates and the alkali zincates herein set forth. The alkali silicates are, of course, soluble silicates which include sodium and potassium water glass. The soluble silicates are described in the book entitled "Soluble Silicates in Industry" by James G. Vail, of the Philadelphia Quartz Company, Chemical Catalog Company, Inc., New York, 1928, and in the later edition of this work.

In carrying out the present invention, a monohydric phenol, such as phenol $C_6H_5OH$, and formaldehyde are mixed to form an aqueous solution, and this is added to an aqueous solution of silicate of sodium, the products being stirred in order to facilitate the mixture thereof. In a few seconds a gel is formed, and this gel when subjected to the influence of infra red rays is rapidly transformed into a homogeneous resin reaction complex which may when loading materials are added thereto, be molded in the usual manner in which Bakelite is molded. The operation to form the resin in this way may be carried out in one hour, and the finished molding powder may be obtained in less than two hours.

It may well be that the sodium ion of the silicate of sodium acts as a catalyzer, but it must be recognized that the condensation or polymerization of the catalyzed phenol-formaldehyde mixture with caustic soda requires a very long heating period in order to attain the desired state of polymerization or condensation. Therefore, it is believed that in the method of the present invention, the silicate of sodium and its equivalents as herein pointed out, acts through the effects of infra red rays in order to form a polymerized resin complex in which the alkali silicate is a constituent part.

The quantity of the alkali silicate or the other alkaline gel-forming salts of relatively low acidity should be present in an amount corresponding to at least 5% of the neutral and dry alkali sodium silicate, said percentage being taken on the weight of the mixture of phenol and formaldehyde or urea and formaldehyde or the mixture of phenol and cresol used in carrying out the invention. Very satisfactory results have been obtained when the dry alkali silicate or soluble silicate of the character herein set forth and the equivalents thereof is present in an amount varying between 5% and 20%, and preferably between 5% and 15% taken on the weight of the phenol-formaldehyde mixture.

In order to produce a molding material, the herein described condensation product may be mixed with the common filling materials as well as pigments and/or coloring ingredients, and these ingredients do not impede the process. On the other hand, the general time for the production of the finished molding material is shortened and there is obtained a dry and pulverulent material which may be molded by heating. Operating with the necessary loading materials, the completely finished molded article carrying the filling and pigmenting materials may be produced in substantially two hours. Instead of producing the condensation product of a monohydric phenol and an aldehyde as, for example, formaldehyde or other aldehydes, the condensation product may be urea aldehyde condensation product formed in the presence of alkali silicate or its equivalents, which, subjected to the action of infra red rays, produces a resin with the advantage that the resin remains stable in all the different manufacturing stages. The invention will be illustrated by the following examples:

*Example I*

A mixture is made of 37 parts of 38 to 40% formaldehyde, 20 parts of phenol $C_6H_5OH$ which is a liquid, and 15 parts of cresol. Separately there is prepared a mixture of 8 parts of an aqueous solution of a neutral silicate of sodium having a concentration of 60° Baumé, and 30 parts of water. This mixture is agitated until a homogeneous solution is obtained. The mixture of formaldehyde, phenol and cresol is added to the silicate of sodium solution and the resulting mass is lightly stirred for a few seconds as, for example, 2 to 10 seconds, during which time a gel is formed, and the latter is then submitted to the action of infra red rays. The gelled mass, after a time, for example, 5 to 30 minutes, shows a momentary liquefaction which, upon continuing the above-described procedure, can be mixed with the filling material, thus obtaining the desired molding powder.

Although the mechanism of the reaction is unknown, it has been observed that the action of infra red rays raises the temperature of the mass to approximately 53° C. at which temperature a loss of hydrogen occurs, and an exothermic reaction takes place which raises the temperature to between about 90° and about 96° C. Of course, with different masses of material and materials having somewhat different characteristics, these temperature limits will change. However, the important point is that the infra red rays induce an exothermic reaction which raises the temperature of the mixture and causes a heat reaction to take place between the ingredients to produce a resin which is a B-resin, that is, a resin which is a thermosetting resin.

In this particular example, the total time for the infra red ray treatment is about forty minutes, after which the necessary filling or loading material may be directly incorporated. While these loading materials may be added in accordance with the prior art practice, the following is exemplary of a suitable mix. There may be added to the phenolformaldehyde condensation product 50 parts by weight of sawdust, 20 parts of rice husks, 10 parts of granulated talcum or granulated quartz, or granulated S-silica, such as quartz, two parts of zinc stearate or aluminum stearate, two parts of dibutyl phthalate, and the desired amount of coloring ingredients as is known in the prior art. The filling materials are taken on the weight of the resin condensation complex.

The incorporation of the aforesaid loading materials in the resin condensation complex must be effected so as to form a homogeneous composition. The resulting mixture may be used as a molding compound in accordance with prior art practice.

*Example II*

60 parts of urea and 160 parts of 38 to 40% formaldehyde are mixed together. Separately there is prepared a solution of 8 parts of neutral silicate of sodium having a concentration of about 60° Baumé, said solution being mixed with 20 parts of water until a homogeneous solution is obtained. The urea-formaldehyde solution is treated with a converting agent which will convert the solution to a state of neutrality or to a state of slight alkalinity as, for example, to a pH of 7.5. While ammonia is the preferred converting agent, other equivalent basic materials may be used, such as, for example, sodium hydroxide, sodium carbonate, and the like.

The so-prepared urea-formaldehyde solution is allowed to rest or age for a short period of time, preferably at room temperature, that is, around 20° C., and some interaction may take place. Illustratively, the ageing period may be about two hours, although this may vary considerably as, for example, from 30 minutes to two hours, or from 30 minutes to one hour, or from 30 minutes to three hours. The above-prepared sodium silicate solution is added to the urea-formaldehyde solution while lightly stirring. In a few seconds a gel is formed and then the gelled mass is subjected to the action of infra red rays to effect reaction of the ingredients and the production of a urea-formaldehyde-silicate condensation complex.

The period for which the mass is subjected to the action of infra red rays may vary in accordance with the amount of the mixture and the physical and chemical properties of the ingredients. However, for the proportions set forth a period of six hours gives a very satisfactory condensation product.

The infra red rays induce an exothermic reaction, and the temperature must be held not higher than about 50° C. Usually the temperature is controlled between 40° and 45° C. or between 40° and 50° C., and in some cases between 45° C. and 50° C., but this is the maximum temperature. If this temperature is exceeded, then a much denser gel is formed, and this is not desirable. There may be added to the so-produced resin condensation complex 40 parts of sawdust, two parts of stearate of zinc, four parts of zinc oxide, two parts of pentaerythritol, one part of hexamethylenetetramine, and necessary coloring elements. Fifty parts of ethyl alcohol may be added. The resin condensation product and the above-added loading, plasticizer and hardening ingredients are well mixed in the presence of 50 parts of ethyl alcohol, and then the mass is left to dry. This will produce a product which is capable of being molded. The alcohol evaporated during drying may be caught, condensed and re-used. The filling materials are taken on the weight of the resin condensation complex.

Instead of adding ethyl alcohol and drying, there may be added 50 parts of ethyl alcohol and lactic acid or other acids, such as hydrochloric acid, to adjust the pH between the limits of about 6.5 and 7.5. Thereafter, the resulting mass is dried.

*Example III*

A mixture is prepared of 60 parts of urea, 200 parts of 30 to 40% formaldehyde, and 50% of phenol $C_6H_5OH$. The pH is adjusted to not less than 7 and may be higher with ammonia or its equivalent, and the mixture is left to rest for about two hours at room temperature. The mixture ages during this period, and there may be some reaction. Instead of using ammonia, other equivalent agents or converting agents may be used. Separately there is prepared a mixture of 15 parts of neutral sodium silicate having a concentration of about 60° Baumé, and 40 parts of water. These two solutions are mixed one with the other, and the treatment is continued in a manner set forth in Example II. There is obtained a white molding powder. In spite of the presence of the phenol, when light colors are produced the colors remain invariable under the action of the sun rays. The same result may be obtained by mixing at once the urea, formaldehyde and phenol with the sodium silicate and water mixture, thus forming the desired gel without letting it age. Subjecting the gel to infra red rays, a resin is formed, the only disadvantage being that the time of the above mentioned reaction takes from 30 to 60 minutes longer.

The resin condensation complex can be advantageously granulated by passing through a roller press or mangle with heated cylinders, the material thereby forming a ribbon of predetermined thickness which may be granulated and used for molding. Instead of the above mentioned mangle, an extrusion press may be used, the material thereby forming cords of a reduced diameter, which may be turned into homogeneous granules by applying to the press a cutting device.

The quantities of the reacting materials are the preferred ones in the experiments set forth. However, these quantities admit a variation within a rather large limit. The quantitative description of some of the components, especially the filling and loading components, are not to be considered as limiting. Rather they are to be considered as illustrative. Further, the fillers may be substituted by other well known fillers used in the art. In general, the maximum quantity of the filling products amounts to about 150% of the resin reaction complex which allows for the production of a suitable soft plastic material for molding purposes. The amount of filling ingredients may vary between 0% and 150%. The quantity of the gelling agent, that is, of the alkali silicate, alkali zincate, alkali aluminate, should not be employed in an amount less than about 5% of the dry gelling agent, said percentage being taken on the weight of the mixture of phenol and aldehyde or urea and aldehyde or phenol urea and aldehyde. As stated, in general the limits are between 5% and 20% or between 5% and 15%. The sodium zincate and the sodium aluminate or the lithium zincate or lithium aluminate or the potassium zincate or potassium aluminate will act in a manner equivalent to the neutral sodium silicate or soluble silicate. In practice the alkali silicate may be substituted by equivalent weights of alkali zincate or alkali aluminate in accordance with stoichiometric proportions. In general, the limits of 5% and 20% cover any of these gelling agents. The phenol is preferably selected from the group of monohydric phenols having a distillation range between 175° C. and about 225° C. For the most part the phenol may be selected from the group consisting of phenol per se $C_6H_5OH$, cresol, and xylenol. The molar ratio of the aldehyde to the phenol may vary from 0:.9 to 3:1.

What is claimed is:

1. The method of preparing a thermosetting formaldehyde-phenol resin condensation product comprising forming a mixture of formaldehyde and a monohydric phenol selected from the group consisting of monohydric phenols having a distillation range between about 175 and 225° C., the molar ratio of the formaldehyde to the phenol being between 0.9 and 3 mols of the former for each mol of the latter, incorporating in said formaldehyde-phenol mixture an aqueous solution of an alkali silicate in an amount equivalent to between 5 and 15% of dry alkali silicate taken on the weight of the formaldehyde-phenol mixture, agitating the resulting mixture until a gelatinous mass is formed, subjecting the latter to the action of infra-red rays and causing a heat reaction between the components of the gelatinous mass, said mass simultaneously being condensed until a thermosetting resin reaction-product is formed.

2. The method of preparing a thermosetting formaldehyde-phenol resin condensation product comprising forming a mixture of formaldehyde and a monohydric phenol selected from the group consisting of monohydric phenols having a distillation range between about 175 and 225° C., the molar ratio of the formaldehyde to the phenol being between 0.9 and 3 mols of the former for each mol of the latter, incorporating in said formaldehyde-phenol mixture an aqueous solution of a sodium silicate in an amount equivalent to between 5 and 15% of dry sodium silicate taken on the weight of the formaldehyde-phenol mixture, agitating the resulting mixture until a gelatinous mass is formed, subjecting the latter to the action of infra-red rays and causing a heat reaction between the components of the gelatinous mass, said mass simultaneously being condensed until a thermosetting resin reaction-product is formed.

3. The method defined in claim 1 in which the monohydric phenol is phenol per se, $C_6H_5OH$.

4. The method defined in claim 2 in which the monohydric phenol is phenol per se, $C_6H_5OH$.

5. The method of preparing a thermosetting formaldehyde-phenol resin condensation product comprising forming an aqueous mixture of 37 parts of 38 to 40% formaldehyde, 35 parts of a mixture of phenol and cresol, and 8 parts of an aqueous solution of sodium silicate, agitating the resultant mixture until a gelatinous mass is formed, and subjecting the latter to the action of infra-red rays and causing a heat reaction between the components of the gelatinous mass, said mass simultaneously being condensed until a thermosetting resin reaction-product is formed.

6. The method of preparing a thermosetting formaldehyde-phenol resin condensation product comprising forming an aqueous mixture of 37 parts of 38 to 40% formaldehyde, 20 parts of phenol, 15 parts of cresol, and 8 parts of an aqueous solution of sodium silicate, agitating the resulting mixture until a gelatinous mass is formed, and subjecting the latter to the action of infra-red rays and causing a heat reaction between the components of the gelatinous mass, said mass simultaneously being condensed until a thermosetting resin reaction-product is formed.

7. The method of preparing a thermosetting formaldehyde-phenol resin condensation product comprising forming an aqueous mixture of 37 parts of 38 to 40% formaldehyde, 20 parts of phenol, 15 parts of cresol, and 8 parts of an aqueous solution of sodium silicate, agitating the resulting mixture until a gelatinous mass is formed, subjecting the latter to the action of infra-red rays and causing a heat reaction between the components of the gelatinous mass, said mass simultaneously being condensed until a thermosetting resin reaction-product is formed, homogeneously mixing with said resin reaction-product 50 parts of sawdust, 20 parts of rice husks, 10 parts of siliceous material selected from the group consisting of granulated talcum and silica, 2 parts of stearate selected from the group consisting of zinc stearate and aluminum stearate, and a plasticizer, the resulting homogeneous composition forming a molding compound.

8. The method of preparing a urea-formaldehyde condensation product comprising forming an aqueous solution of urea and formaldehyde, incorporating in said urea-formaldehyde mixture an aqueous solution of an alkali silicate in an amount equivalent to between 5 and 15% of a dry alkali silicate taken on the weight of the urea-formaldehyde mixture, agitating the resulting mixture until a gelatinous mass is formed, and subjecting the latter to the action of infra-red rays and causing a heat reaction between the components of the gelatinous mass, the latter simultaneously being condensed until a thermosetting resin reaction-product is formed.

9. The method of forming a molded resin comprising preparing a thermosetting formaldehyde-phenol resin condensation product by aqueously forming a mixture of formaldehyde and monohydric phenol having a distillation range between about 175° C. and 225° C., the molar ratio of the formaldehyde to the phenol being between 0.9 and 3 mols of the former for each mol of the latter, incorporating in said formaldehyde-phenol mixture an aqueous solution of an alkali silicate in an amount equivalent to between 5 and 15% of a dry alkali silicate taken on the weight of the formaldehyde-phenol mixture, forming a gelatinous mass therefrom, subjecting the resulting mass to the action of infra-red rays and causing a heat reaction between the components of the gelatinous mass, the latter being simultaneously condensed until a thermosetting resinous reaction-product is formed, retaining the alkali components in said infra-red ray treated resin, and molding and completing the polymerization of the resulting resinous mass in the presence of said alkali components.

10. The method of forming a molded product comprising preparing a thermosetting formaldehyde-phenol resin condensation product by mixing an aqueous mixture of 37 parts of 38 to 40% formaldehyde, 35 parts of a mixture of phenol and cresol, and 8 parts of an aqueous solution of sodium silicate, agitating the resultant mixture until a gelatinous mass is formed, subjecting the latter to the action of infra-red rays and causing a heat reaction between the components of the gelatinous mass, said mass simultaneously being condensed until a thermosetting resin reaction-product is formed, retaining the alkali components in said infra-red ray treated resin, and molding and completing the polymerization of the resulting resinous mass in the presence of said alkali components.

11. The method of preparing a thermosetting formaldehyde-phenol resin condensation product comprising forming a mixture of formaldehyde and a monohydric phenol selected from the group consisting of monohydric phenols having a distillation range between about 175° and 225° C., the molar ratio of the formaldehyde to the phenol being between 0.9 and 3 mols of the former for each mol of the latter, incorporating in said formaldehyde-phenol mixture an aqueous solution of a gel forming material selected from the group consisting of alkali silicates, alkali aluminates, and alkali zincates, said gel forming material being employed in an amount equivalent to between 5 and 15% of dry gel forming material taken on the weight of the formaldehyde-phenol mixture, agitating the resulting mixture until a gelatinous mass is formed, subjecting the latter to the action of infra-red rays and causing a heat reaction between the components of the gelatinous mass, said mass simultaneously being condensed until a thermosetting resin reaction-product is formed.

12. The method of preparing a thermosetting formaldehyde-phenol resin condensation product comprising forming a mixture of formaldehyde and a monohydric phenol selected from the group consisting of monohydric phenols having a distillation range between about 175° and 225° C., the molar ratio of the formaldehyde to the phenol being between 0.9 and 3 mols of the former for each mol of the latter, incorporating in said formaldehyde-phenol mixture an aqueous solution of a gel forming material in an amount equivalent to between 5 and 15% of dry gel forming material taken on the weight of the formaldehyde-phenol mixture, agitating the resulting mixture until a gelatinous mass is formed, subjecting the latter to the action of infra-red rays and causing a heat reaction between the components of the gelatinous mass, said mass simultaneously being condensed until a thermosetting resin reaction-product is formed.

References Cited in the file of this patent
UNITED STATES PATENTS 2,224,815   Glycofrides _____ Dec. 10, 1940

OTHER REFERENCES

Chemical Abstracts, vol. 42 (1948), page 2438.